(12) United States Patent
Miyagawa

(10) Patent No.: US 7,286,154 B2
(45) Date of Patent: Oct. 23, 2007

(54) POLARIZATION-DIRECTION-CONTROLLING ELEMENT AND EXPOSURE DEVICE

(75) Inventor: Ichirou Miyagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/202,245

(22) Filed: Aug. 12, 2005

(65) Prior Publication Data

US 2005/0280697 A1 Dec. 22, 2005

Related U.S. Application Data

(62) Division of application No. 10/180,075, filed on Jun. 27, 2002, now Pat. No. 6,967,671.

(30) Foreign Application Priority Data

Jul. 2, 2001 (JP) ............................. 2001-201407

(51) Int. Cl.
  *B41J 27/00* (2006.01)
(52) U.S. Cl. ....................... 347/241; 347/256
(58) Field of Classification Search ........ 347/241–244, 347/256–258; 359/301–302, 485, 487, 488, 359/495, 497, 500, 565; 355/71; 349/96, 349/98; 372/106; 362/19; 430/2, 322
See application file for complete search history.

(56) References Cited

U.S. PATENT DOCUMENTS

| 3,438,692 A | 4/1969 | Tabor et al. |
| 4,712,881 A | 12/1987 | Shurtz, II et al. |
| 5,467,166 A * | 11/1995 | Shiraishi .................... 355/71 |
| 5,576,829 A | 11/1996 | Shiraishi et al. |
| 6,084,714 A | 7/2000 | Ushiyama et al. |
| 6,091,543 A | 7/2000 | Bergman |
| 6,130,701 A * | 10/2000 | Ito ............................ 347/241 |
| 6,147,802 A * | 11/2000 | Itoh et al. ................... 359/500 |
| 6,172,722 B1 | 1/2001 | Sharp |
| 6,229,646 B1 * | 5/2001 | Mitsutake et al. ......... 359/487 |
| 6,560,015 B1 | 5/2003 | Cao |
| 6,582,081 B2 | 6/2003 | Seo et al. |

FOREIGN PATENT DOCUMENTS

| EP | 0 709 216 A2 | 5/1996 |
| EP | 1 008 895 A1 | 6/2000 |
| JP | 2000-284206 A | 10/2000 |

* cited by examiner

*Primary Examiner*—Hai Pham
(74) *Attorney, Agent, or Firm*—Sughrue Mion Pllc.

(57) ABSTRACT

A polarization-direction-controlling element comprising a ½ wavelength plate disposed with a crystal optical axis tilted at substantially 45 degrees with respect to a polarization direction of a beam of light separated by a polarization-separating element with a part of a laser beam transmitted, is provided on the optical path of the laser beam, outputted from a plurality of semiconductor lasers, between an outlet for the laser beams at a fiber array and a polarization-separating element for separating the laser beam into two beams of light having mutually orthogonal polarization directions. A polarization-direction-controlling element capable of improving the quality of recorded images in an exposing-recording device using an element with polarization dependency and an exposure device capable of improving the quality of recorded images can also be obtained.

3 Claims, 14 Drawing Sheets

POLARIZATION-DIRECTION-CONTROLLING ELEMENT AND EXPOSURE DEVICE

This is a divisional of application Ser. No. 10/180,075 filed Jun. 27, 2002 now U.S. Pat. No. 6,967,671. The entire disclosure of the prior application, application Ser. No. 10/180,075, is hereby incorporated by reference.

BACKGROUND OF THE INVENTION

1. Field of the Invention

The present invention relates to a polarization-direction-controlling element and an exposure device. More specifically, it relates to a polarization-direction-controlling element and an exposure device used in an exposing-recording device for forming an image by scanning a recording medium with light outputted from a light source.

2. Description of the Related Art

An exposing-recording device for recording a two-dimensional image on a photosensitive material by rotating a drum with the photosensitive material (recording medium) mounted on the outer circumferential surface in a main scanning direction and directing a laser beam modulated according to image data of an image to be recorded on the photosensitive material for scanning in a sub scanning direction orthogonal to the main scanning direction, has been conventionally used.

In this kind of the exposing-recording device, in order to record an image with a low resolution, a method in which a spot size of the laser beam on the photosensitive material surface is reduced and a recording pitch in the sub scanning direction is widened, or a pixel of the same image data is repeatedly recorded for reduction of the resolution without change in the spot size or the recording pitch. In contrast, in order to record an image with a high resolution, an opposite method is used.

In order to enlarge or reduce the laser beam spot size, however, a lens of an optical system, or the like should be driven by a driving mechanism, and thus there is a problem in that the device becomes bulky and the costs are increased. Moreover, when a pixel of the same image data is repeatedly recorded in order to reduce the resolution, the recording pitch in the sub scanning direction is constant, and thus there is a problem in that a recording speed cannot be improved.

Therefore, in order to solve these problems, according to the technique disclosed in the official gazette of the Japanese Patent Application Laid-open (JP-A) No. 2000-284206 by the present inventor, a plural-focal-point-producing means for dividing a beam of light outputted from a light source into a plurality of beams of light and for producing a plurality of focal points on a recording medium with respect to the sub scanning direction of the recording medium by using a light-condensing optical system, and a sub-scanning-controlling means for controlling the recording interval in the sub scanning direction according to the resolution are provided. As a result, the number of the focal points, which are produced by the plural focal point producing means by division of the beam of light in the sub scanning direction according to a desired resolution of the recorded image at the time of image recording by condensing the light outputted from the light source on the recording medium via the light-condensing optical system, is controlled in order to adjust the size of the beam spot and to adjust the recording interval of the beam spot in the sub scanning direction. This enables efficient recording of an image at the desired resolution.

In order to improve recording speed, there is an exposing-recording device in which laser beams outputted from a plurality of light sources are each guided to a single exposure head by an optical fiber and in which laser-beam outlets, which are each disposed at an end of one of the optical fibers at the exposure head, are provided side by side for simultaneously executing the exposure by the plurality of the laser beams outputted from the plurality of the light sources.

When the above-mentioned technique disclosed in JP-A No. 2000-284206 is used in this kind of the exposing-recording device, exposure with a laser beam divided into a plurality of laser beams is possible, and thus further improvement in recording speed can be achieved.

However, according to the above-mentioned exposing-recording device using the optical fibers, the polarization direction of the light outputted from the optical fibers may change over time due to displacement by external forces applied to the optical fibers (including vibration, pressure, and distortion), temperature displacement, or the like as shown in FIG. 14. In this case, since the light is divided unevenly among the plurality of beams so as to make the focal spots unstable, there is a problem in that the quality of the recorded image is deteriorated.

In other words, as shown in FIG. 15A as an example, in a case where two focal points are produced by the above-mentioned plural focal point producing means by using as the light source a semiconductor laser, with an intensity distribution having a high central light intensity, and the light intensity is gradually lowered as it moves away from the center, it is ideal in terms of image quality, to have the intensity distribution of the two resulting beams of light correspond to the two focal points in the same state as shown in FIG. 15B.

In a case where the laser beam polarization direction is changed over time as mentioned above, however, since there is a risk of the intensities of the two resulting beams of light corresponding to the focal points becoming drastically different as shown in FIG. 15C, the image quality of the recorded image may be deteriorated. According to an experiment conducted by the present inventor, it was found that the polarization ratio of the horizontal polarization and the vertical polarization (horizontal polarization:vertical polarization) is changed in a range of 1:4 to 4:1 when an optical-fiber-coupled semiconductor laser is used as a light source.

SUMMARY OF THE INVENTION

In order to solve the above-mentioned problems, the present invention has been achieved, and a first object thereof is to provide a polarization-direction-controlling element capable of improving the image quality of a recorded image in an exposing-recording device using an element having the polarization dependency, and a second object is to provide an exposure device capable of improving the image quality of a recorded image.

In order to achieve the above-mentioned first object, a first aspect of the invention is a polarization-direction-controlling element to be provided at an upstream side, in an optical-axis direction, of a beam of light in an exposure device using a polarization-separating element for separating the beam of light into two beams of light having mutually orthogonal polarization directions, the polarization-direction-controlling element comprising: a plate-like base, having two mutually parallel flat surfaces for transmitting the beam of light, one of the two surfaces being an incident surface to which the beam of light is irradiated, and the other being an output surface for outputting the light; and a plurality of ½ wavelength plates provided on at least one of the incident surface and the output surface of the base such that a crystal optical axis of each of the ½ wavelength plates is tilted at an angle within a predetermined range, which includes 45 degrees, with respect to a polarization direction of the beam of light to be separated by the polarization-separating element. The above-mentioned crystal optical axis is referred to also as the "optical axis", however, in this specification, it is disclosed as the "crystal optical axis". Furthermore, although the predetermined angle range including 45 degrees is ideally 45 degrees, it denotes an angle in various tolerance ranges such as an angle in the tolerance range in the production of the polarization-direction-controlling element, an angle in the tolerance range in a device using the polarization-direction-controlling element, or the like.

Here, with reference to FIG. 13, the principal of the invention will be explained. A case of the polarization-direction-controlling element of the invention provided as a combination of a ½ wavelength plate and a transparent parallel plate without a drastic influence on the polarization direction of a transmitted light will be described.

As shown in FIG. 13, with the premise that the polarization direction of the light to be separated by the polarization-separating element is (x, y), the polarization-direction-controlling element is disposed so as to have the direction of the crystal optical axis of the ½ wavelength plate in the polarization-direction-controlling element is tilted by 45 degrees with respect to (x, y). The coordinate system of the crystal optical axis in the ½ wavelength plate is defined to be (X, Y). Moreover, with the premise that the light transmissivity of the transparent parallel plate and that of the ½ wavelength plate in the polarization-direction-controlling element have no difference, or it is so small that it can be ignored, the polarization-direction-controlling element is disposed at a position such that the ratio of the amount of light incident on the ½ wavelength plate and the amount of light not to be incident, that is, a light incident on the transparent parallel plate is 1:1.

With the premise that the electric field vector α of a light incident on the polarization-direction-controlling element is α=(a, b), in consideration of a light incident on the ½ wavelength plate, a matrix A for rotating the (x, y) coordinate system by 45 degrees, a matrix B for delaying the light of the Y coordinate by a ½ wavelength phase and a matrix C for rotating by −45 degrees to the original (x, y) coordinate system can be represented as follows.

$$\alpha = \begin{pmatrix} a \\ b \end{pmatrix} \quad (1)$$

$$A = \begin{pmatrix} \cos 45° & \sin 45° \\ -\sin 45° & \cos 45° \end{pmatrix} = \frac{\sqrt{2}}{2} \begin{pmatrix} 1 & 1 \\ -1 & 1 \end{pmatrix}$$

$$B = \begin{pmatrix} 1 & 0 \\ 0 & e^{-i\pi} \end{pmatrix} = \begin{pmatrix} 1 & 0 \\ 0 & -1 \end{pmatrix}$$

$$C = \begin{pmatrix} \cos 45° & -\sin 45° \\ \sin 45° & \cos 45° \end{pmatrix} = \frac{\sqrt{2}}{2} \begin{pmatrix} 1 & -1 \\ 1 & 1 \end{pmatrix}$$

Therefore, the electric field vector β of the light after passing through the ½ wavelength plate can be represented as follows.

$$\beta = C \cdot B \cdot A \cdot \alpha = \begin{pmatrix} a \\ b \end{pmatrix} \quad (2)$$

Since α and β are set so as to be 1:1 as the amount of light distribution, each light amount Iα, Iβ are represented as follows.

$$I\alpha = \begin{pmatrix} I & \alpha & x \\ I & \alpha & y \end{pmatrix} = \frac{\alpha^2}{2} = \frac{1}{2} \begin{pmatrix} a^2 \\ b^2 \end{pmatrix} \quad (3)$$

$$I\beta = \begin{pmatrix} I & \beta & x \\ I & \beta & y \end{pmatrix} = \frac{\beta^2}{2} = \frac{1}{2} \begin{pmatrix} a^2 \\ b^2 \end{pmatrix}$$

Therefore, the amount of light I as the summation of the lights is represented as follows.

$$I = \begin{pmatrix} I & x \\ I & y \end{pmatrix} = I\alpha + I\beta = \frac{1}{2} \begin{pmatrix} a^2 + b^2 \\ a^2 + b^2 \end{pmatrix} \quad (4)$$

This result denotes that in the case the light transmitted the ½ wavelength plate and the light not transmitted are added, the light separated by the polarization-separating element into the x and y polarization directions is separated by the equal light amount.

The transparent parallel plate provided here in the polarization-direction-controlling element need not always provided, and another member not having a significant influence on the polarization direction of an incident light (such as an ND (Neutral Density) filter) can be used instead of the transparent parallel plate, or it is also possible to have a configuration in which these members are not provided.

According to the above-mentioned principal, the polarization-direction-controlling element of the first aspect of the invention can separate an amount of light into the equal amounts by the polarization-separating element in the case of use in a combination with a polarization-separating element so that the image quality of the recorded image can be improved in an exposing-recording device using the polarization-separating element.

In order to separate a light into equal amounts by the polarization-separating element as mentioned above, it is necessary that the amount of light is distributed so as to have the ratio of the amount of light incident on the ½ wavelength plate and the amount of light not incident thereon to be 1:1 in the condition that the light transmissivity of the transparent parallel plate in the polarization-direction-controlling element (or a member provided instead of the transparent parallel plate such as the above-mentioned ND filter, or a part without providing anything) and that of the ½ wavelength plate is same or so small to an ignorable degree.

Then, a second aspect of the invention is the polarization-direction-controlling element according to the first aspect, wherein the area ratio of an area of the ½ wavelength plate to have the light incident thereon and an area of the light not to be incident on the ½ wavelength plate is substantially 1:1. Thereby, the intensity distribution of the separated light can be evened. The "area of the light not to be incident on the ½ wavelength" here corresponds to the area of the above-mentioned transparent parallel plate with the light incident thereon, the area of the member instead of the transparent parallel plate, such as the ND filter with the light incident thereon, or the area of a portion where nothing is provided with the light incident thereon.

According to the second aspect, although it is advantageous in terms of evening the intensity distribution of a separated light on the condition that the light transmissivity of the transparent parallel plate (or the member instead of the transparent parallel plate such as the above-mentioned ND filter, or the part without providing anything) and that of the ½ wavelength plate are same or small to an ignorable degree, in the case the difference of the light transmissivity is not in an ignorable degree, the separated light intensity distribution can hardly be evened.

Then, a third aspect of the invention is the first aspect, wherein the area ratio of an area of the ½ wavelength plate to have the light incident thereon and an area of the light not to be incident on the ½ wavelength plate is provided such that the amount of lights of the two beams of light obtained by the polarization-separating element are substantially same. Thereby, the intensity distribution of the separated light can certainly be evened. The "area of the light not to be incident on the ½ wavelength" here also corresponds to the area of the above-mentioned transparent parallel plate with the light incident thereon, the area of the member instead of the transparent parallel plate, such as the ND filter with the light incident thereon, or the area of the portion where nothing is provided with the light incident thereon.

As a specific embodiment of the third aspect of the invention, in the case the light transmissivity ratio (½ wavelength plate:passage area of the light not incident on the ½ wavelength plate) in the polarization direction of the light separated by the polarization-separating element of the ½ wavelength plate and the passage area of the light not incident on the ½ wavelength plate (the above-mentioned transparent parallel plate, the member instead of the transparent parallel plate such as the ND filter, or the part without providing anything)=1:η, the ratio of the area H of the ½ wavelength plate with the light incident thereon and the area S with the light not incident on the ½ wavelength plate can be set as represented by the following formula.

(H:S)=η:1

Moreover, according to a fourth aspect of the invention, a polarization-direction-controlling element is provided, which may comprise a plurality of ½ wavelength plates disposed at predetermined intervals in the entire incident area of the light.

Furthermore, according to a fifth aspect of the invention, a polarization-direction-controlling element for controlling the polarization direction of an incident light is provided, wherein a ½ wavelength plate is disposed so that the amount of lights of the transmitted light and the light not transmitted is substantially same.

As a specific method for having the substantially same light amount at the time, in addition to the method of adjusting the area ratio of the area of the ½ wavelength plate with the light incident thereon and the area of the light not incident on the ½ wavelength plate, a method of adjusting the amount of light transmitted the ½ wavelength plate and the light not transmitted by using at least one selected the group consisting of an AR coating (Anti reflection coating) and an ND filter can be used.

Furthermore, a polarization-direction-controlling element according to a sixth aspect of the invention is configured by attaching the ½ wavelength plate on a transparent parallel plate.

The above-mentioned transparent parallel plate need not always completely transparent or have a 100% light transmissivity as long as it does not drastically change the polarization direction of the incident light.

On the other hand, in order to achieve the above-mentioned second aspect, a seventh aspect of the invention provides an exposure device comprising a light source for outputting a beam of light, a light-condensing optical system for condensing the beam of light outputted from the light source onto a recording medium, a polarization-separating element for separating the beam of light into two beams of light having mutually orthogonal polarization directions, and the polarization-direction-controlling element according to any of the first to sixth aspects, disposed between the light source and the polarization-separating element, with the crystal optical axis of the ½ wavelength plate tilted at an angle within a predetermined range, which includes 45 degrees, with respect to a polarization direction of the beam of light separated by the polarization-separating element.

According to the exposure device of the seventh aspect of the invention, at the time the light outputted from the light source is collected on the recording medium by the light-condensing optical system, the light is separated into the two beams of light with the polarization directions orthogonal with each other by the polarization-separating element. The above-mentioned light source includes various kinds of semiconductor lasers. Moreover, the above-mentioned polarization-separating element includes various kinds of prisms, such as a Rochon Prism and a Wollaston Prism.

Furthermore, although the predetermined angle range including 45 degrees is ideally 45 degrees, it denotes an angle in various tolerance ranges such as a tolerance range in the exposure device of the invention.

According to the exposure device of the seventh aspect of the invention, a light can be separated by the equal amount by the polarization-separating element so that the quality of the image can be improved at the time of recording an image on a recording medium by the separated lights.

An exposure device of an eighth aspect of the invention is the exposure device according to the seventh aspect, wherein the polarization-separating element is for separating the beam of light into two beams of light that include an ordinary ray and an extraordinary ray.

Here, according to a ninth aspect of the invention, the polarization-separating element is provided at a position where the light is a parallel light flux for outputting the two beams of light with different angles so that the light can be separated.

Moreover, according to a tenth aspect of the invention, the light can be separated by providing the polarization-separating element at a position where the light diverges or position where the light converges so as to output the two beams of light from different positions with respect to the light separation direction of the polarization-separating element.

Furthermore, according to an eleventh aspect of the invention, a transfer section is further provided for transferring the polarization-separating element so as to be inserted on the optical axis of the light or removed therefrom so that the resolution can be changed easily at the time of recording the image on the recording medium by inserting or removing the polarization-separating element by the moving section with respect to the optical path.

Moreover, according to a twelfth aspect of the invention, a transfer section is further provided for transferring the polarization-direction-controlling element and the polarization-separating element so as to be inserted to the optical axis of the beam of light or removed therefrom simultaneously so that the resolution can be changed easily at the time of recording the image on the recording medium by inserting or removing the polarization-direction-controlling element and the polarization-separating element by the moving means with respect to the optical path.

DETAILED DESCRIPTION OF THE PREFERRED EMBODIMENTS

Hereinafter, with reference to the drawings, embodiments of the present invention will be explained in detail. In the description below, the case of using a polarization-direction-controlling element and an exposure device according to the invention in a laser recording device will be explained.

First Embodiment

Figure 15A:
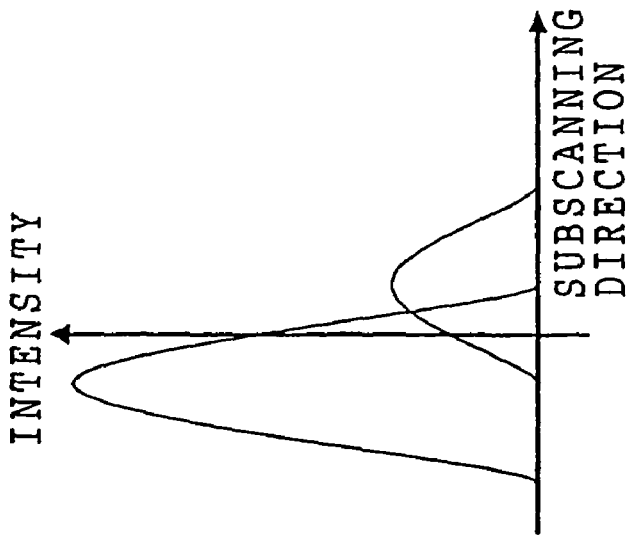
FIGS. 15A-15C are graphs showing examples of the state of the intensity distribution of a laser beam at the focal point.

First, with reference to FIG. 1, the configuration of the laser recording device 10A according to the first embodiment will be explained. As shown in the figure, the laser recording device 10A according to the first embodiment comprises three or more odd number of (in this embodiment, seven) semiconductor lasers LD, each for outputting a laser beam, an exposure head 12 for condensing the laser beams outputted from each semiconductor laser LD, a drum 14 with a recording film F for recording an image mounted, to be rotated and driven so as to move the recording film F in the main scanning direction, and a sub scanning motor 16 for moving an exposure head 12 disposed on a ball screw 18 in the sub scanning direction orthogonal to the main scanning direction by rotating and driving the ball screw 18. In this embodiment, as the semiconductor lasers LD, an optical fiber coupled semiconductor laser with the intensity distribution shown in FIG. 15A is used.

In contrast, in the exposure head 12, a fiber array section 30 is provided for outputting the laser beams guided by the above-mentioned odd number of the semiconductor lasers LD collectively so that the laser beam outputted from each semiconductor laser LD is guided to the fiber array section 30 by each optical fiber 20. In this embodiment, a multiple mode optical fiber having a relatively large core size is used as the optical fiber 20 for having a high laser beam power.

Figure 1:
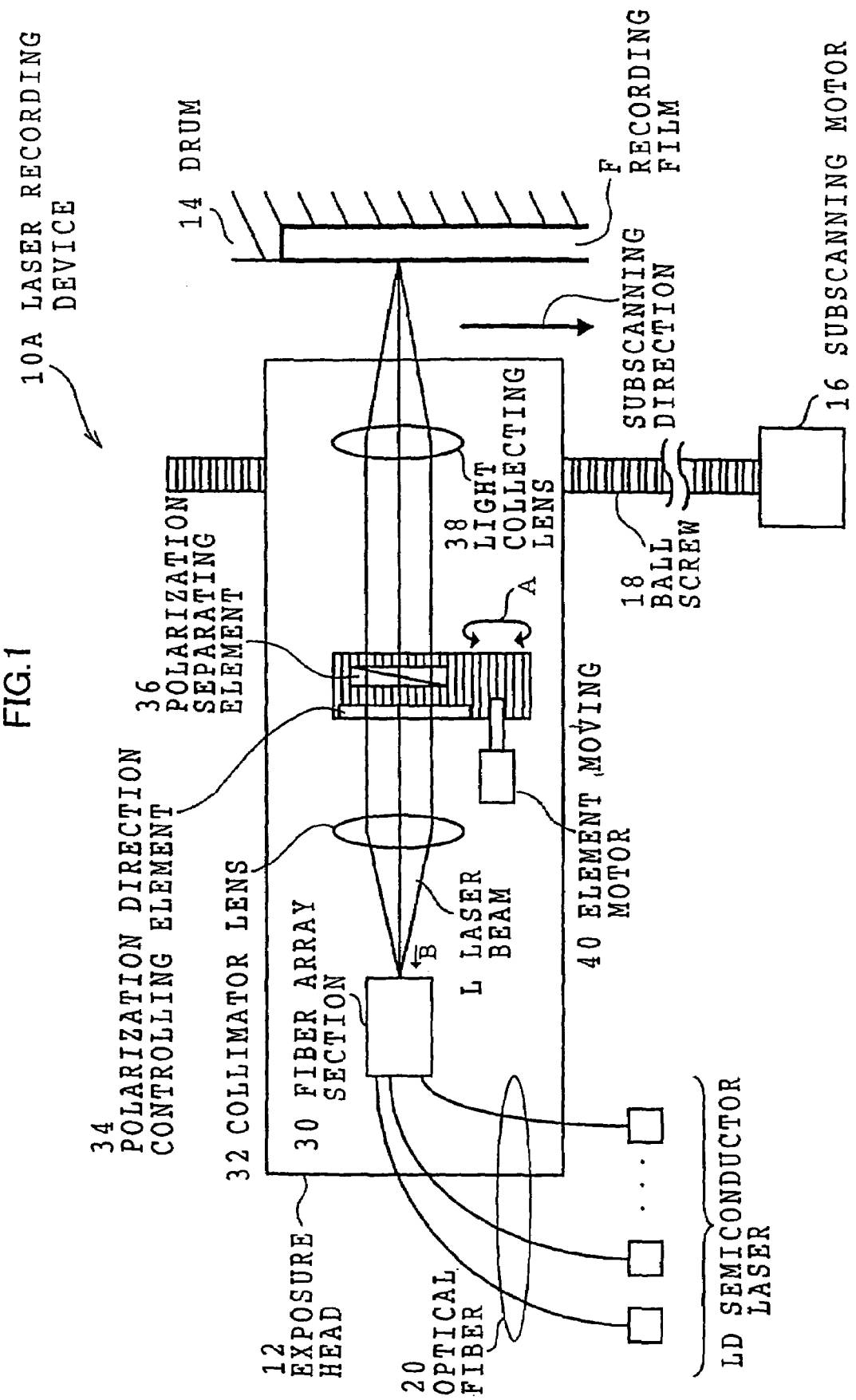
FIG. 1 is a schematic configuration diagram (plan view) of a laser recording device 10A according to a first embodiment of the present invention.
Figure 2:
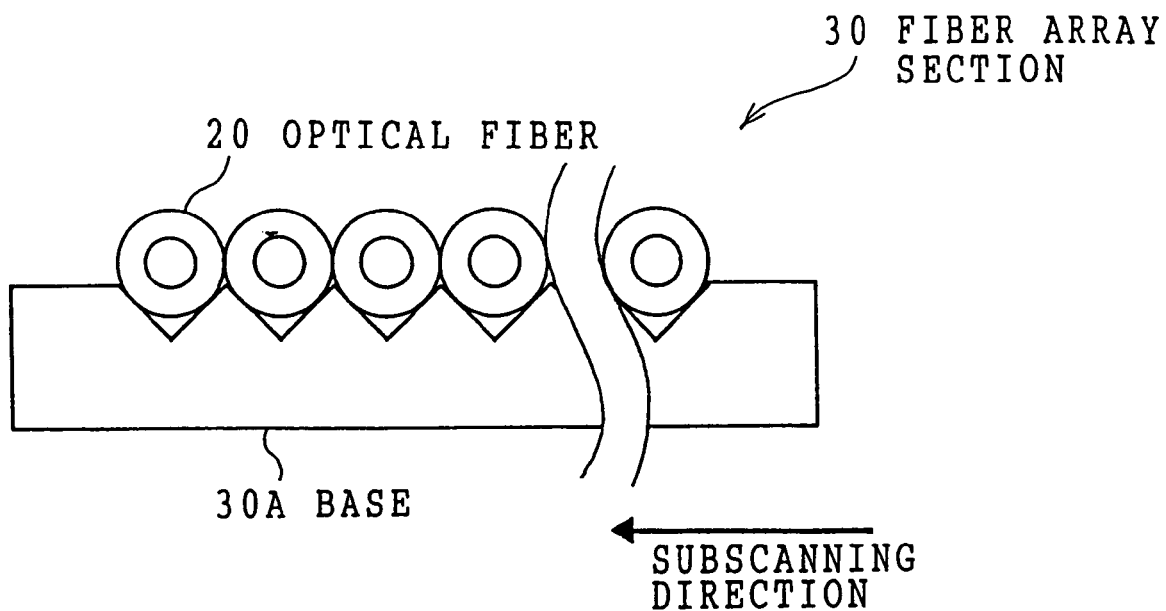
FIG. 2 is a schematic configuration diagram (side view) of a fiber array part 30 according to the first embodiment of the invention.

FIG. 2 shows the configuration of the fiber array section 30 viewed from the arrow B direction in FIG. 1. As shown in the figure, the fiber array section 30 according to this embodiment is provided with a base 30A having V-shaped grooves of the same number as that of the semiconductor lasers LD formed on the upper surface along the sub scanning direction adjacent with each other, and one each optical fiber 20 fitted in the V-shaped grooves. Therefore, a plurality of laser beams L outputted from each semiconductor laser LD are provided from the fiber array section 30 along the sub scanning direction per a predetermined interval.

Moreover, in the exposure head 12, a collimator lens 32, a polarization-direction-controlling element 34, a polarization-separating element 36 and a light collecting lens 38 are arranged successively from the fiber array section 30 side.

Furthermore, the exposure head 12 is provided with an element moving motor 40 for inserting the polarization-separating element 36 on the optical path of the laser beam L or removing therefrom by rotation around the rotation axis in the arrow A direction in FIG. 1.

Figure 3:
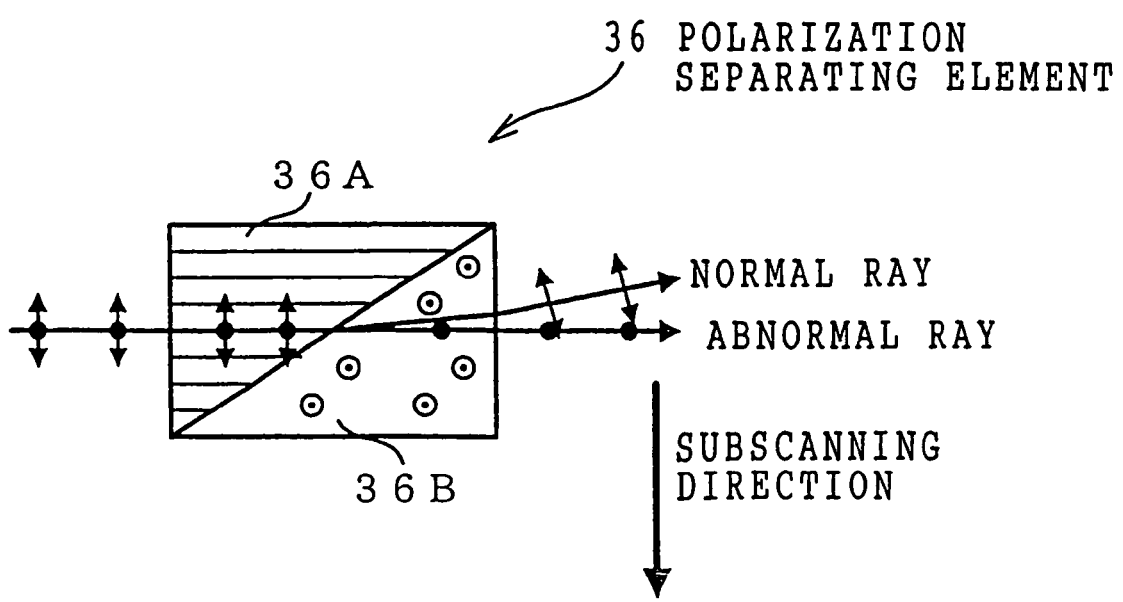
FIG. 3 is a schematic diagram (plan view) for explaining the configuration and the function of a polarizations separating element 36 according to the first embodiment of the invention.

As shown in FIG. 3, the polarization-separating element 36 according to this embodiment is a Rochon prism produced by attaching two uniaxial crystals 36A, 36B with the crystal optical axes orthogonal with each other, for separating a laser beam L into a normal ray and an abnormal ray with respect to the sub scanning direction of the recording film F. For example, the crystal optical axis of the uniaxial crystal 36A disposed on the laser beam L incident side is set parallel with the optical axis of the laser beam L, and the crystal optical axis of the one 0061 is crystal 36B disposed on the laser beam L output side is set in the direction orthogonal to the optical axis of the laser beam L and the sub scanning direction. In this case, the normal ray moves straight in the polarization-separating element 36, and the abnormal ray 36 is bent by the polarization-separating element 36 in the sub scanning direction.

As the polarization-separating element 36, a Wollaston prism having the crystal optical axis of the uniaxial crystal 36A which is set so as to be orthogonal to the optical axis of the laser beam L and the sub scanning direction, and the crystal optical axis of the uniaxial crystal 36B which is set so as to be orthogonal to the optical axis of the laser beam L and the sub scanning direction, can be used as well.

Moreover, the polarization-separating element 36 need not always separate the laser beam L always into the normal ray and the abnormal ray. Another one capable of separating the same into two beams of light with different polarization directions can be used.

Figure 4A:
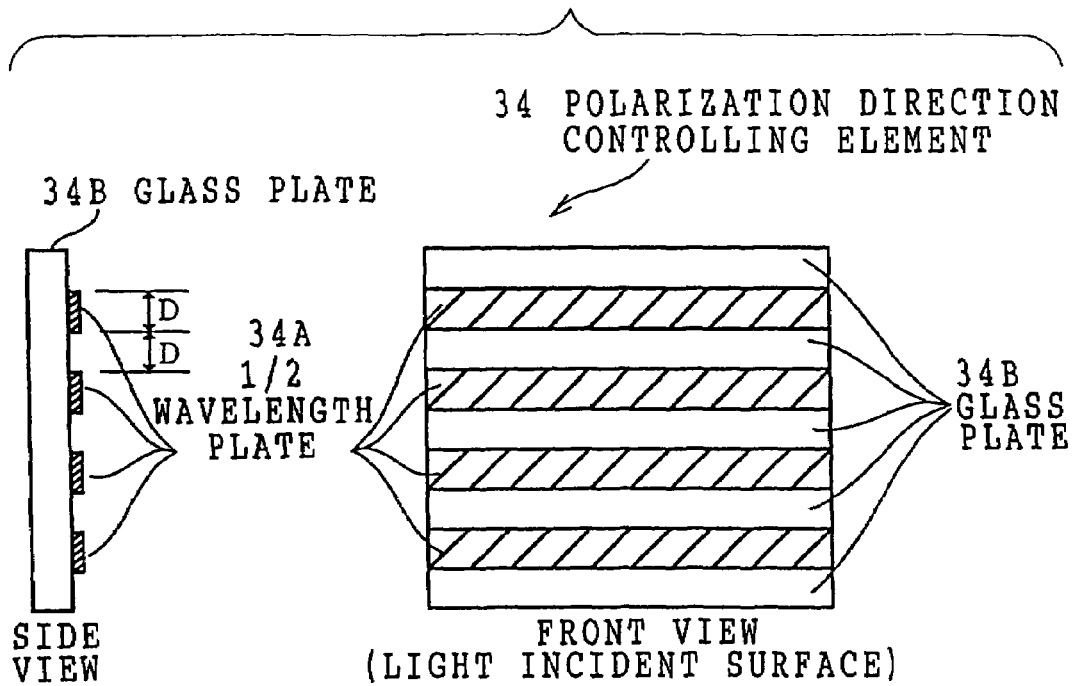
FIG. 4A is a schematic configuration diagram (plan view and side view) of a polarization-direction-controlling element 34 according to the first embodiment of the invention.
Figure 4B:
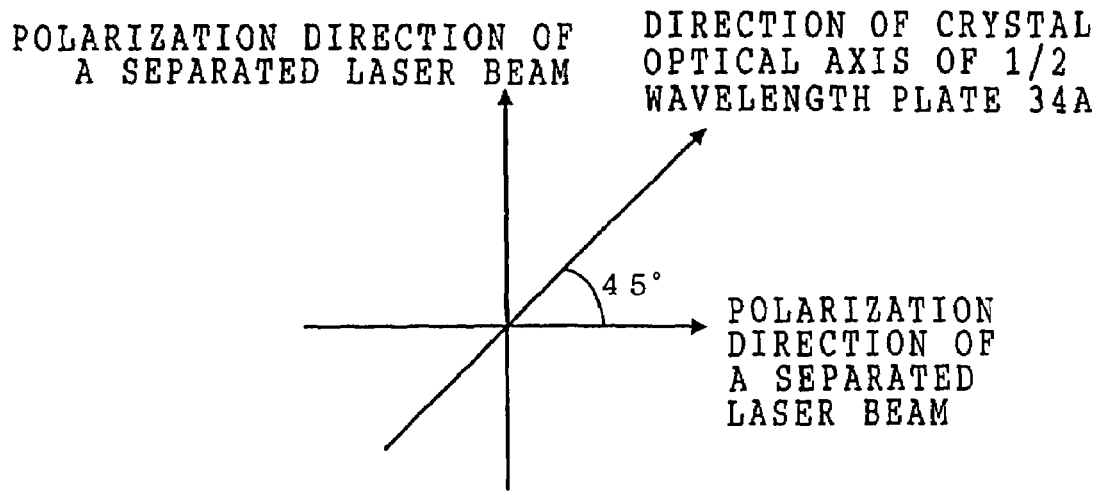
FIG. 4B is a schematic diagram showing the crystal optical axis direction of the polarization-direction-controlling element 34 according to the first embodiment of the invention.

In contrast, as shown in FIG. 4A and FIG. 4B, the polarization-direction-controlling element 34 according to this embodiment comprises a glass plate 34B as the base and a ½ wavelength plate 34A disposed on the upstream side in the optical axis direction of the polarization-separating element 36 such that a part of the laser beam L is transmitted as well as the crystal optical axis is tilted substantially by 45 degrees with respect to the polarization direction of the light to be separated by the polarization-separating element 36. Moreover, here, the polarization-direction-controlling element 34 is provided by bonding a plurality of the ½ wavelength plates 34A on the glass plate 34B by each both end parts (in the part not having the laser beam L transmission) by a predetermined interval such that the ratio of the areas of the ½ wavelength plate 34A and the glass plate 34B for having the incident light can be substantially 1:1.

Here, the polarization-direction-controlling element 34 of this embodiment is designed so as to have an optical fiber 20 with about a 50 μm to 60 μm core size, about a 20 mm beam size of the laser beam L in the light incident surface and about a 2 mm arrangement pitch interval D (see the side view of FIG. 4A) in the light incident surface of the ½ wavelength plate 34A and the glass plate 34B. Thereby, the amount of light of the laser beam incident on the ½ wavelength plate 34A and the amount of light of the laser beam directly incident on the glass plate 34B can be substantially equal to each other.

Accordingly, the polarization-direction-controlling element 34 of this embodiment comprises a plurality of the ½ wavelength plates 34A by a predetermined interval D in the entire laser beam L incident area such that the ratio of the area of the ½ wavelength plate 34A with the laser beam L incident thereon and the area of the laser beam L not incident on the ½ wavelength plate 34A, that is, the area of the glass plate 34B with the laser beam L incident thereon can be substantially 1:1. However, it is also possible to provide the ½ wavelength plate 34A and the glass plate with the ratio of the areas with the laser beam L incident thereon so as to have the amount of lights of the two laser beams obtained by the polarization-separating element 36 be substantially the same based on the device specification of the laser recording device 10A, or the like. Moreover, it is also possible to adjust the position of the ½ wavelength plate 34A so as to have the amount of lights of the laser beam L transmitted the ½ wavelength plate 34A and the laser beam L not transmitted (that is, the laser beam L transmitted only the glass plate 34B) can be substantially the same. Since the configuration of the polarization-direction-controlling element is substantially the same as the one shown in FIG. 4, the polarization-direction-controlling element is not further shown in another figure.

Here, the separation state of the laser beam by the polarization-separating element 36 in the case of not using the polarization-direction-controlling element 34 with the above-mentioned configuration, and in the case of using the same will be explained. First, with reference to FIG. 5, the laser beam separation state in the case of not using the polarization-direction-controlling element 34 will be explained.

Figure 5A:
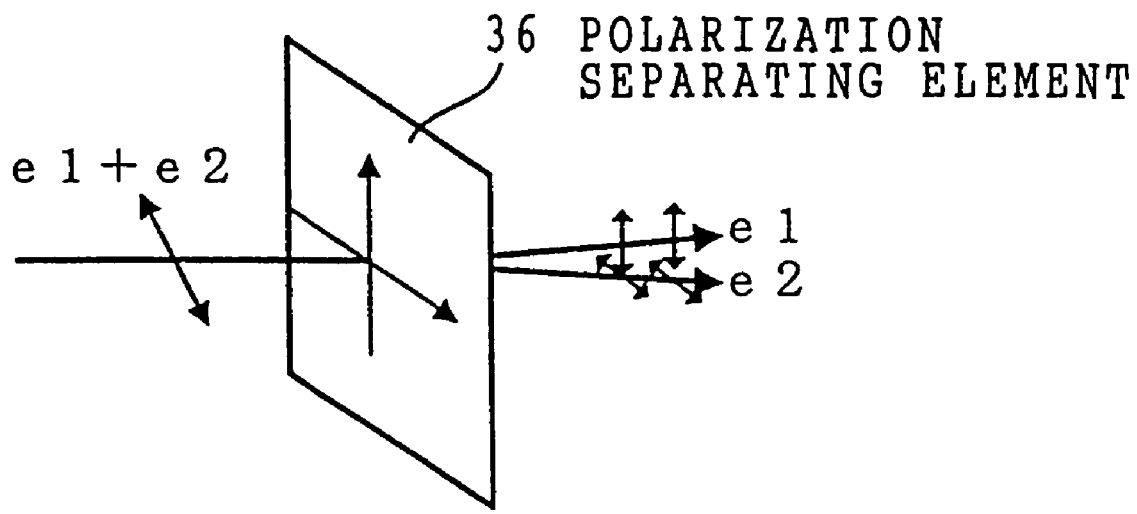
FIGS. 5A and 5B are schematic diagrams showing the separation state of a laser beam by the polarization-separating element 36 in the case without using the polarization-direction-controlling element 34 in the laser recording device 10 according to the first embodiment of the invention.

As shown in FIG. 5A, for example, in the case a laser beam of an e1+e2 polarization (laser beam with a polarization tilted by 45 degrees with respect to the polarization e1) is incident on the polarization-separating element 36, it is separated evenly into two polarization e1 and polarization e2.

Figure 5B:
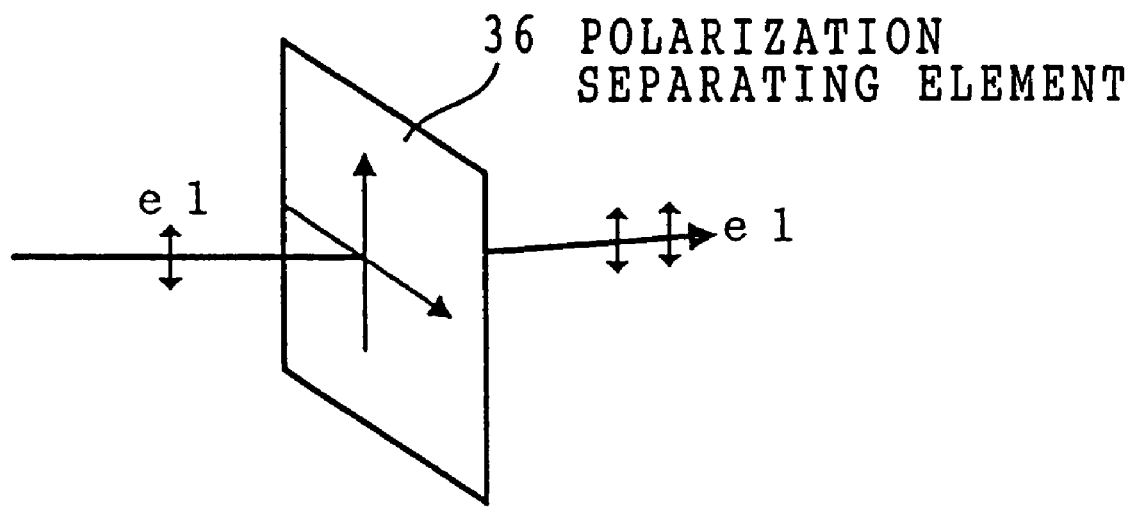

In contrast, as shown in FIG. 5B, in the case a laser beam of the polarization e1 is incident on the polarization-separating element 36, only a laser beam of the polarization e1 is outputted from the polarization-separating element 36. Therefore, in this case, it is difficult to separate this evenly into two laser beams.

Next, with reference to FIGS. 6A and 6B, the laser beam separation state in the case of using the polarization-direction-controlling element 34 will be explained.

Figure 6A:
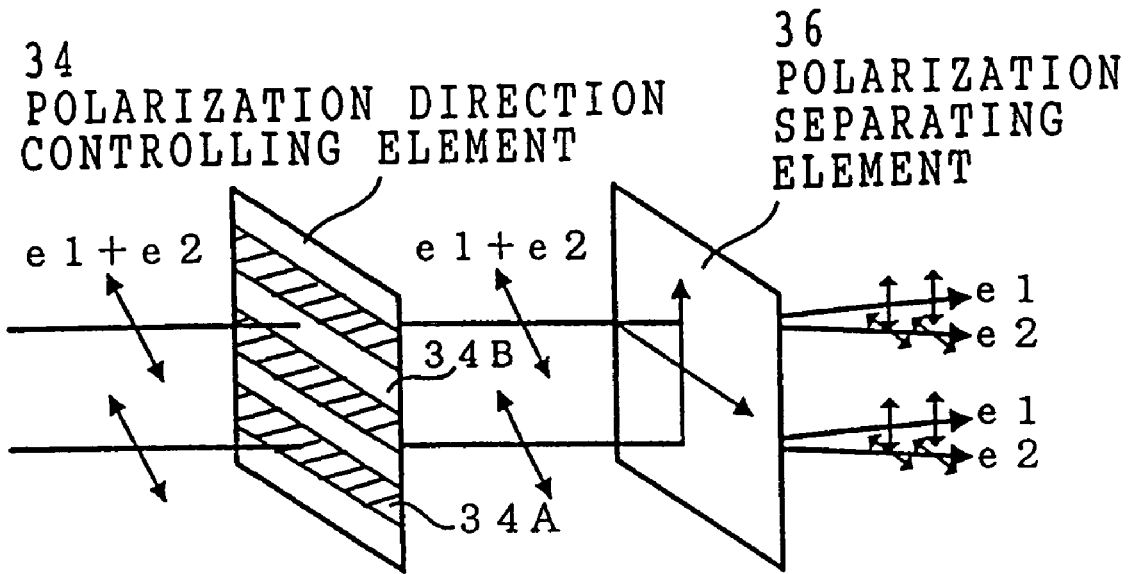
FIGS. 6A and 6B are schematic diagrams showing the separation state of a laser beam by the polarization-separating element 36 in the case of using the polarization-direction-controlling element 34 in the laser recording device 10 according to the first embodiment of the invention.

As shown in FIG. 6A, in the case a laser beam of an e1+e2 polarization (laser beam with a polarization tilted by 45 degrees with respect to the polarization e1) is incident on the glass plate 34B, the laser beam transmits the same without changing the polarization direction so that the transmitted laser beam is incident on the polarization-separating element 36 so as to be separated evenly into two polarization e1 and polarization e2. In contrast, in the case a laser beam of an e1+e2 polarization is incident on the ½ wavelength plate 34A, since the crystal optical axis is tilted by 45 degrees with respect to the polarization e1, the laser beam is transmitted without changing the polarization direction so that the transmitted laser beam is incident on the polarization-separating element 36 so as to be separated evenly into two polarization e1 and polarization e2.

Figure 6B:
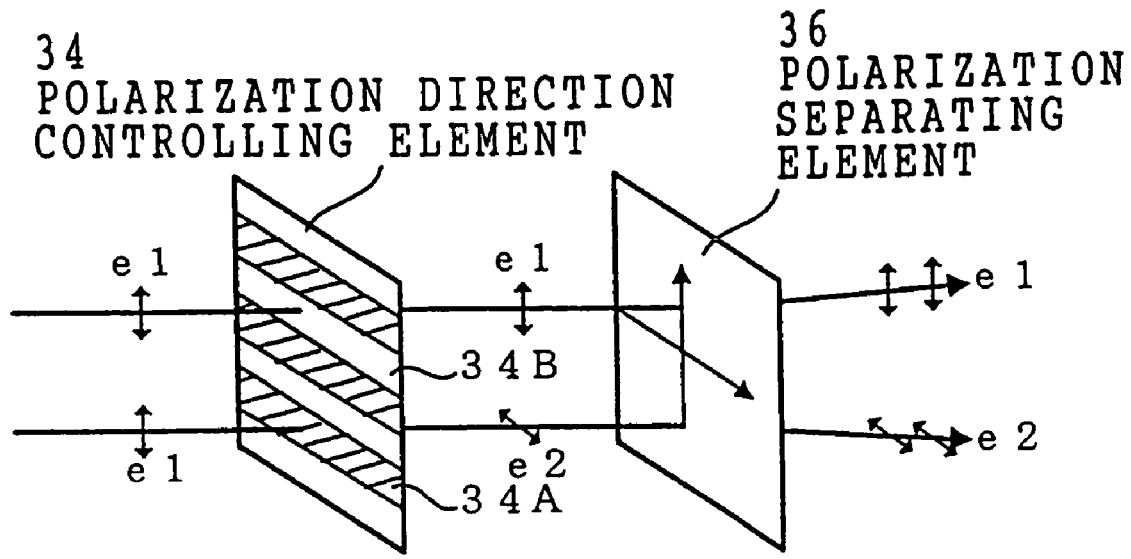

In contrast, as shown in FIG. 6B, in the case a laser beam of the e1 polarization is incident on the glass plate 34B, the laser beam is transmitted without changing the polarization direction so that the transmitted laser beam is incident on the polarization-separating element 36 so as to output a laser beam of only the e1 polarization from the element 36. In contrast, in the case a laser beam of the e1 polarization is incident on the ½ wavelength plate 34A, since the crystal optical axis is tilted by 45 degrees with respect to the polarization e1, the laser beam is outputted as a polarization e2 which is orthogonal to the polarization e1 so that the outputted laser beam is incident on the polarization-separating element 36 so as to output a laser beam of only the polarization e2 from the element 36. Therefore, the laser beam can be divided equally as a whole at different positions in the space.

Figure 7:
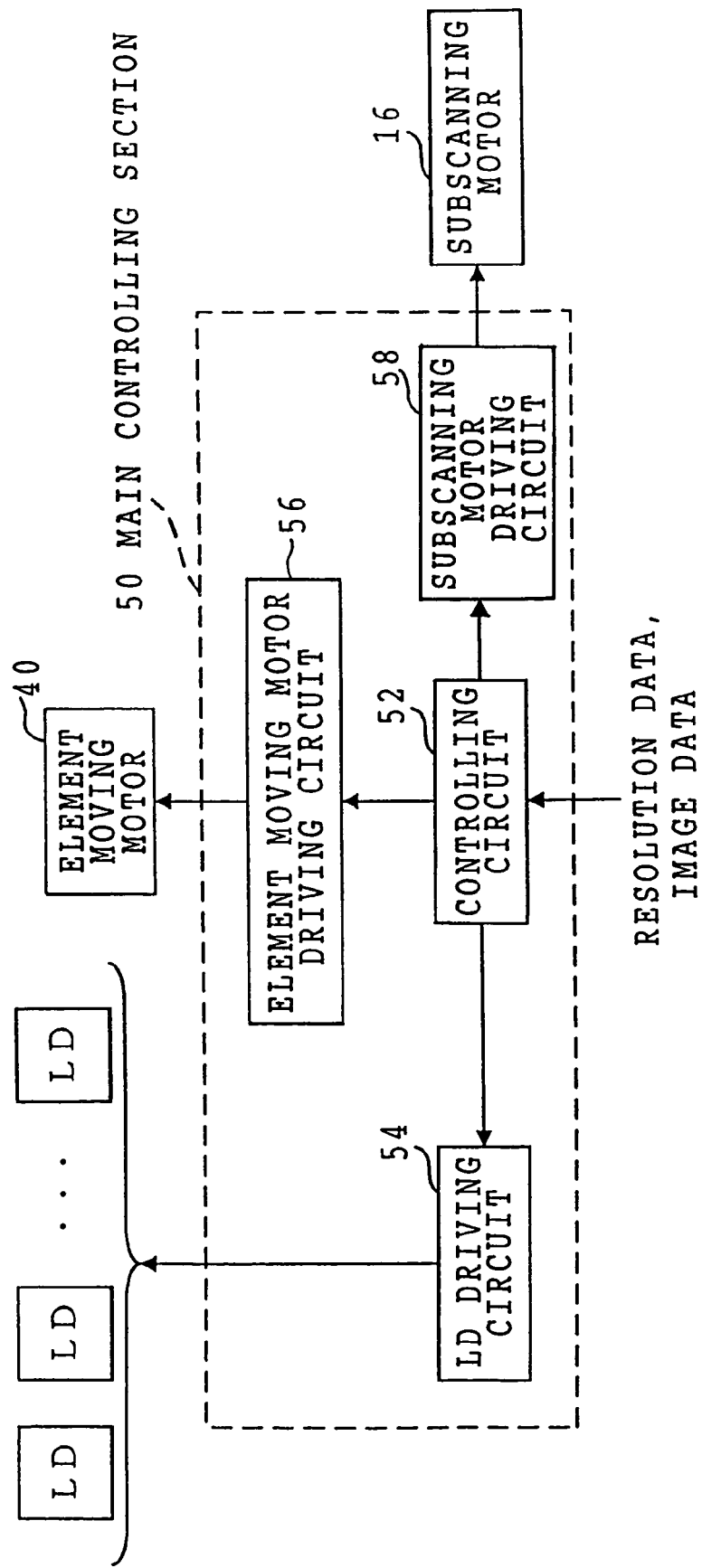
FIG. 7 is a block diagram showing the configuration of a controlling system of the laser recording device 10 according to the first embodiment of the invention.

Next, with reference to FIG. 7, the configuration of the controlling system of the laser recording device 10A according to this embodiment will be explained. As shown in the figure, the controlling system comprises an LD driving circuit 54 for driving the semiconductor laser LD according to image data, an element moving motor driving circuit 56 for driving the element moving motor 40, a sub scanning motor driving circuit 58 for driving the sub scanning motor 16, an LD driving circuit 54 and a controlling circuit 52 for controlling the element moving motor driving circuit 56 and the sub scanning motor driving circuit 58. Here, to the controlling circuit 52, image data showing an image to be recorded on the recording film F and the resolution for recording the image will be supplied.

The glass plate 34B corresponds to the transparent parallel plate of the invention, the semiconductor laser LD corresponds to the light source of the invention, the collimator lens 32 and the light collecting lens 38 correspond to the light-condensing optical system of the invention, and the element moving motor 40 corresponds to the moving section of the invention, respectively.

Figure 8:
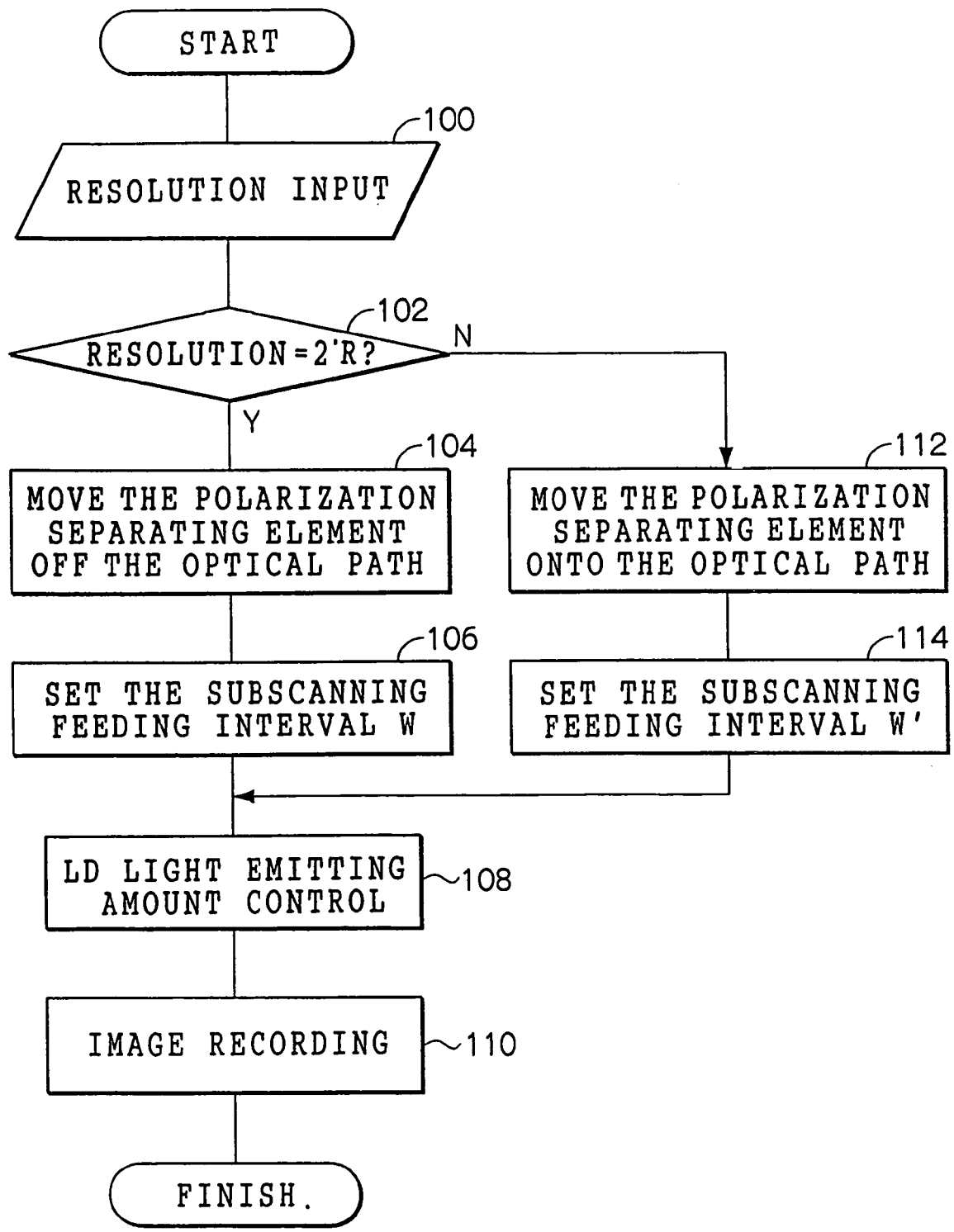
FIG. 8 is a flow chart showing the flow of a process in the case of recording an image according to the resolution.

Next, the operation of the laser recording device 10A with the above-mentioned configuration will be explained with reference to the flow chart of FIG. 8. In the description below, explanation will be given with the premise that the scanning line pitch interval in the sub scanning direction on the high resolution side of the recording film F by each laser beam L in the case of not disposing the polarization-separating element 36 on the optical path of the laser beam L, that is, the case of not separating the laser beam L is defined to be ε, the beam spot interval is set at 2·ε and the beam spot displacement amount by the polarization-separating element 36 on the recording film F by the two laser beams separated by the polarization-separating element 36 is set at ε.

First, the operator inputs resolution data showing the resolution of an image to be recorded in the laser recording device 10A (step 100). The resolution data and the image data of the image to be recorded are supplied to the controlling circuit 52. The recording circuit 52 supplies a signal adjusted based on the data to the LD driving circuit 54, the element moving motor driving circuit 56 and the sub scanning motor driving circuit 58. In this embodiment, explanation will be given below with the premise that an image can be recorded by two kinds of resolutions of R (dpi) and 2·R (dpi) as the above-mentioned resolution.

In the case that the resolution inputted by the operator is 2·R (dpi) (in the case the judgment in the step 102 is positive), the element moving motor driving circuit 56 drives the element moving motor 40 for moving the polarization-separating element 36 so as not to dispose the polarization-separating element 36 on the optical path of the laser beam L (step 104). Moreover, in this case, the sub scanning motor driving circuit 58 sets the feeding interval W in the sub scanning direction of the exposure head 12 by the sub scanning motor 16 as follows (step 106).

$$W = \frac{(N-1) \times 2 \cdot \varepsilon}{2} + \varepsilon = N \cdot \varepsilon \qquad (5)$$

Therein, N represents the number of the semiconductor lasers LD (in this embodiment "7").

That is, in the case that the resolution is 2·R (dpi), by disposing the polarization-separating element 36 out of the optical path of the laser beam L, the laser beam L is not separated into two laser beams (normal ray and abnormal ray) in the sub scanning direction. Thereby, the resolution of double as much as that of the case of separating the laser beam L is realized.

When the polarization-separating element 36 is moved and the feeding interval in the sub scanning direction is set as mentioned above, the LD driving circuit 54 controls the drive of each semiconductor laser LD according to the image data (step 108).

The laser beam L outputted from each semiconductor laser LD is made to be parallel light fluxes by the collimator lens 32 so as to be incident on the polarization-direction-controlling element 34. As to the laser beams L incident on the polarization-direction-controlling element 34, those incident beams on the glass plate 34B are outputted without changing the polarization direction. Moreover, as to the laser beams incident on the ½ wavelength plate 34A, those with the polarization direction identical with the crystal optical axis of the ½ wavelength plate 34A are outputted without changing the polarization direction and those beams with the polarization direction not identical with the crystal optical axis are outputted with the polarization direction which is changed to the direction according to the angle formed by the polarization direction and the crystal optical axis.

The laser beams L outputted from the polarization-direction-controlling element 34 are collected via the light collecting lens 38 onto the recording film F on the drum 14.

Figure 9A:
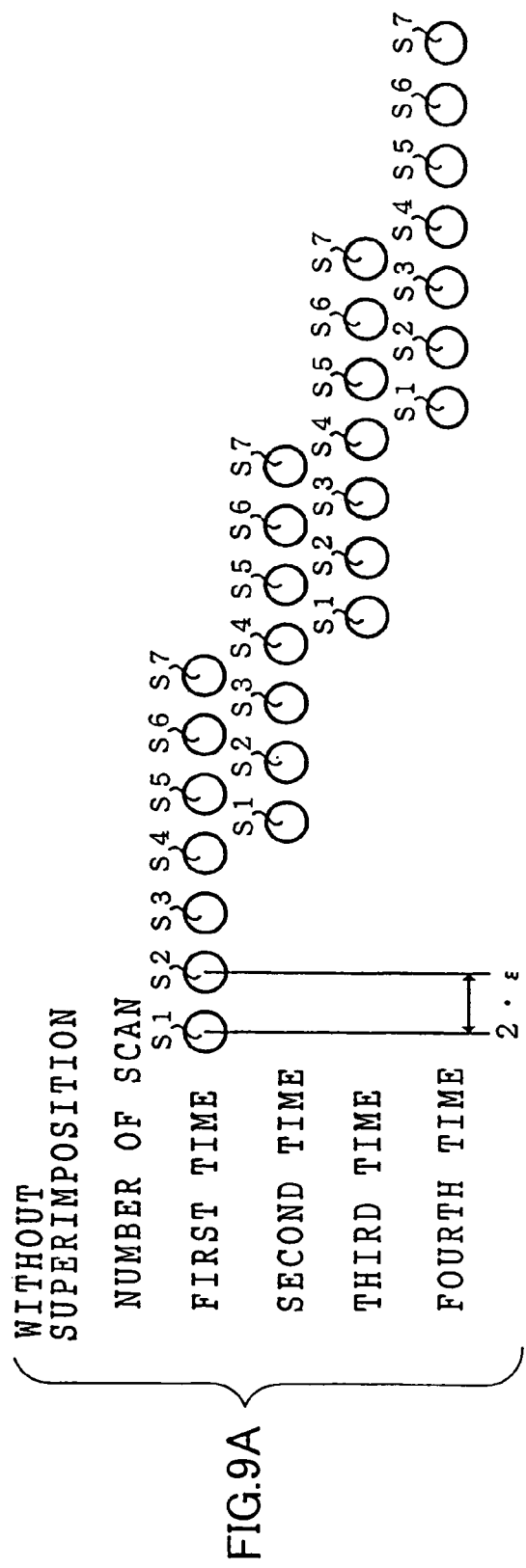
FIGS. 9A and 9B are schematic diagrams showing the state of a beam spot on a recording film F by the laser recording device 10 according to the first embodiment of the invention.

In this case, beam spots S1 to S7 (see FIG. 9A) having the intensity distribution shown in FIG. 15A are formed on the recording film F. As shown in FIG. 9A, according to the beam spots S1 to S7, a two-dimensional image with a 2·R (dpi) resolution is formed on the recording film F by feeding the exposure head 12 in the sub scanning direction by the feeding interval W pitch and rotating the drum 14 in the main scanning direction (step 110).

Next, the case the resolution is changed from 2·R (dpi) to R (dpi) (in the case the judgment in the step 102 is negative) will be explained. In this case, the element driving motor driving circuit 56 drives the element moving motor 40 for moving the polarization-separating element 36 so as to be disposed on the optical path of the laser beam L (step 112). Moreover, in this case, the sub scanning motor driving circuit 58 sets the feeding interval W' in the sub scanning direction of the exposure head 12 by the sub scanning motor 16 as follows (step 114).

$$W' = N \times 2 \cdot \varepsilon \qquad (6)$$

That is, in the case that the resolution is R (dpi), by disposing the polarization-separating element 36 on the optical path of the laser beam L, the laser beam L incident on the polarization-separating element 36 is separated into two laser beams (normal ray and abnormal ray) in the sub scanning direction. Thereby, the resolution of half as much as that of the case of not separating the laser beam L is realized.

When the polarization-separating element 36 is moved and the feeding interval in the sub scanning direction is set as mentioned above, the LD driving circuit 54 controls the drive of each semiconductor laser LD according to the image data (step 108).

The laser beam L outputted from each semiconductor laser LD is made to be parallel light fluxes by the collimator lens 32 so as to be incident on the polarization-direction-controlling element 34. As to the laser beams L incident on the polarization-direction-controlling element 34, those beams incident on the glass plate 34B are outputted without changing the polarization direction. Moreover, as to the laser beams incident on the ½ wavelength plate 34A, those beams with the polarization direction identical with the crystal optical axis of the ½ wavelength plate 34A are outputted without changing the polarization direction and those beams with the polarization direction not identical with the crystal optical axis are outputted with the polarization direction changed to the direction according to the angle formed by the polarization direction and the crystal optical axis.

The laser beams L outputted from the polarization-direction-controlling element 34 are supplied to the polarization-separating element 36 for transmitting both the normal ray and the abnormal ray. The normal ray and the abnormal ray are collected via the light collecting lens 38 onto the recording film F on the drum 14.

Figure 15B:
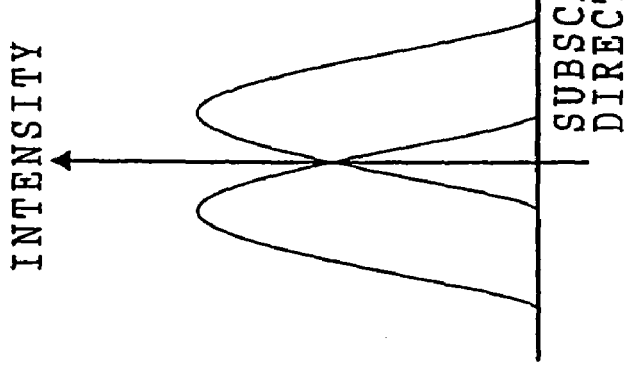
Figure 15C:
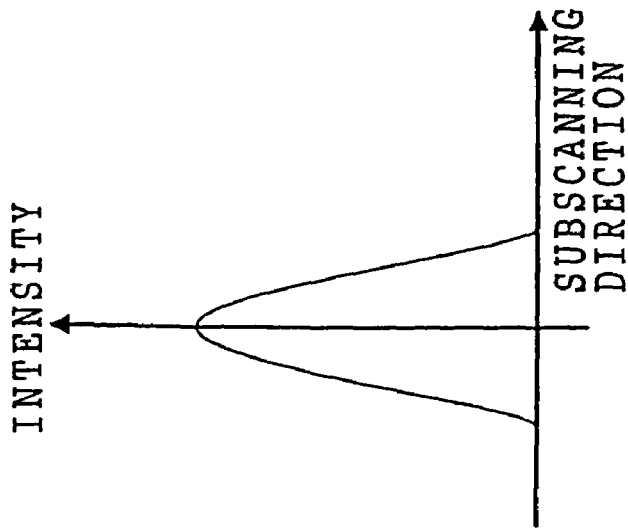

In this case, beam spots S1' to S7' (see FIG. 9B) having the dual intensity distributions shown in FIG. 15B, that is, the intensity distribution of the normal ray and the intensity distribution of the abnormal ray synthesized in the sub scanning direction, are formed on the recording film F.

Figure 9B:
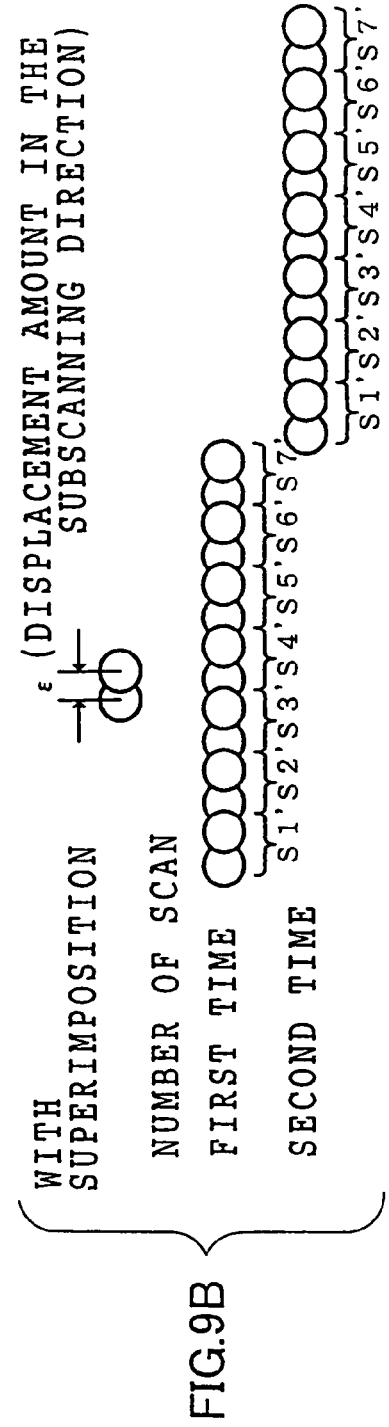

As shown in FIG. 9B, according to the beam spots S1' to S7', a two-dimensional image with a R (dpi) resolution is formed on the recording film F by feeding the exposure head 12 in the sub scanning direction by the feeding interval W' pitch and rotating the drum 14 in the main scanning direction (step 110).

Accordingly, in the case that the resolution of the recorded image is changed from 2·R (dpi) to R (dpi), since the beam spots S1 to S7 can easily be enlarged to the beam spots S1' to S7' by only inserting the polarization-separating element 36 on the optical path of the laser beam L. Furthermore, since the sub scanning speed can be made higher, an image can be recorded at a high speed.

Similarly, the resolution can be changed from R (dpi) to 2·R (dpi).

Second Embodiment

Although a case, in which the polarization-separating element of the invention is disposed at a position where a light is a substantially parallel light flux so as to output two beams of light y different angles, has been explained in the above-mentioned first embodiment, another case, in which the polarization-separating element is disposed at a position where a light is dispersed so as to output two beams of light from different positions with respect to the light separation direction by the polarization-separating element, will be explained in the second embodiment.

Figure 10:
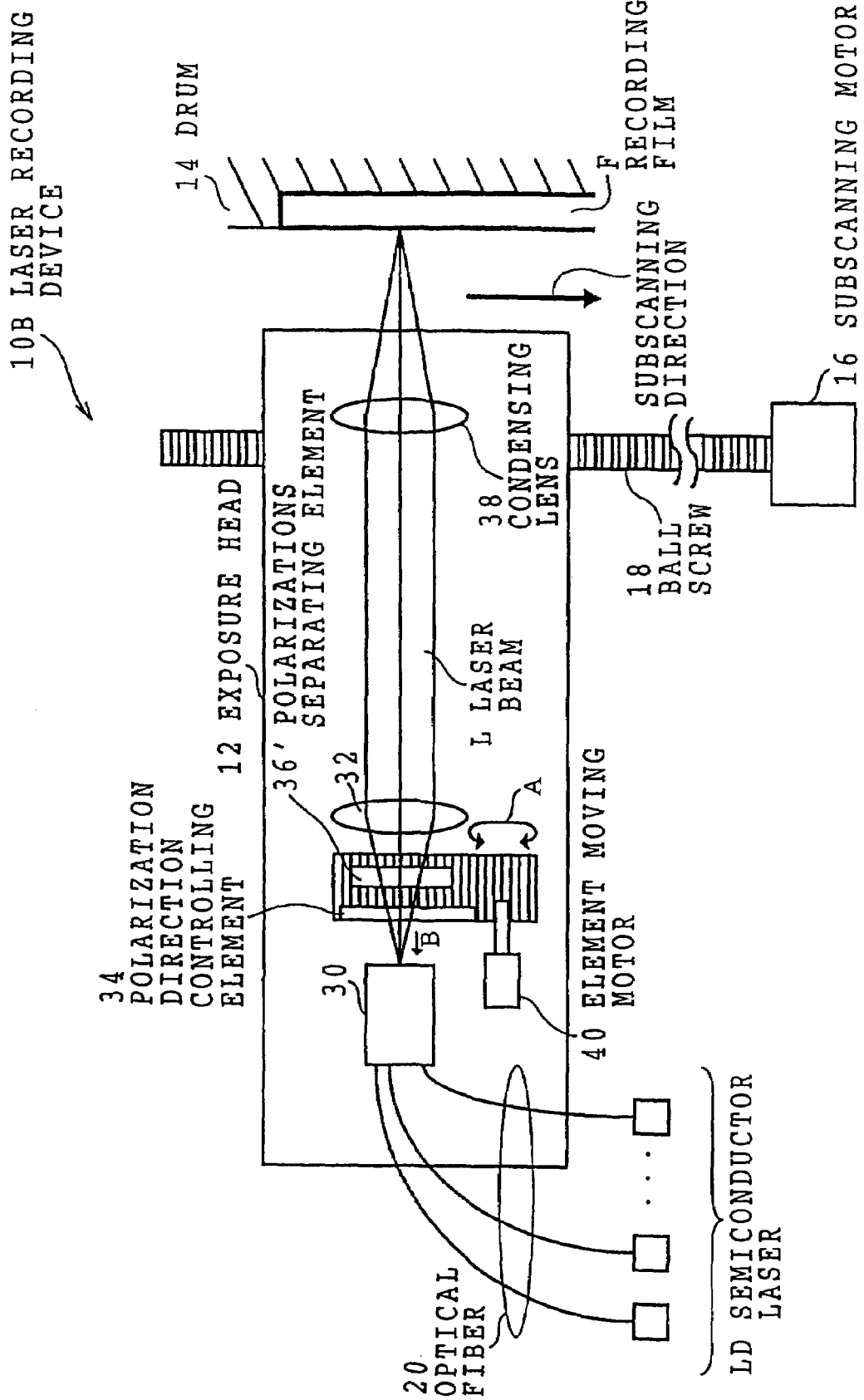
FIG. 10 is a schematic configuration diagram (plan view) of a laser recording device 10B according to a second embodiment of the invention.

First, with reference to FIG. 10, the configuration of a laser recording device 10B according to the second embodiment will be explained. The same components in the figure as those in the laser recording device 10A shown in FIG. 1 are provided with the same numerals as those in FIG. 1 and further explanation is not given here.

As shown in the figure, the laser recording device 10B according to the second embodiment differs from the laser recording device 10A according to the first embodiment in that a polarization-separating element 36' made of an uniaxial crystal is used instead of the polarization-separating element 36 and the polarization-direction-controlling element 34 and the polarization-separating element 36' are disposed at a position where the laser beam L is dispersing between the fiber array section 30 and the collimator lens 32. In this case, the direction of the crystal optical axis of the polarization-separating element 36' is set between the optical axis direction of the laser beam L and the sub scanning direction.

Figure 11:
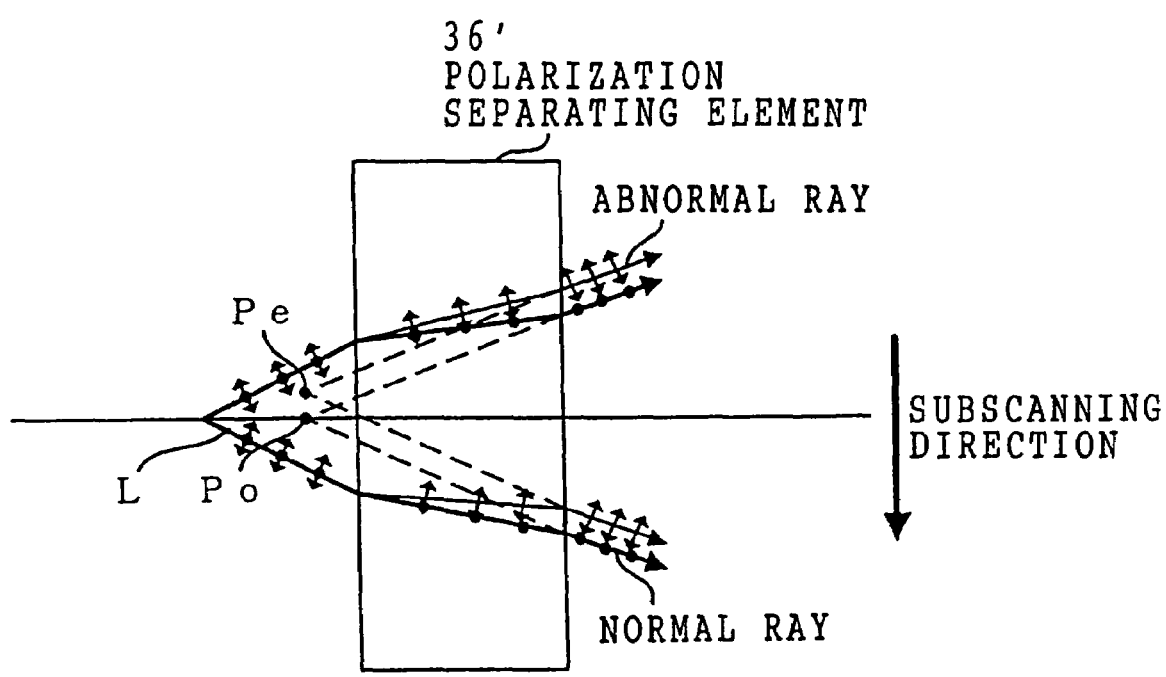
FIG. 11 is a schematic diagram (plan view) for explaining the function of a polarization-separating element 36' according to the second embodiment of the invention.

In the case that the resolution is set at R (dpi) the laser beam L with the polarization direction controlled by the polarization-direction-controlling element 34 is separated into a normal ray and an abnormal ray by the polarization-separating element 36 as shown in FIG. 11. In this case, since the refractive index of the polarization-separating element 36' with respect to the normal ray is constant regardless of the direction of the crystal optical axis, it is emitted from an imaginary light emitting point Po on the optical axis of the laser beam L so as to be guided to the collimator lens 32. In contrast, since the refractive index of the polarization-separating element 36' with respect to the abnormal ray differs depending on the laser beam L incident direction and the crystal optical axis direction. The crystal optical axis is set between the laser beam L optical axis direction and the sub scanning direction, therefore, it is outputted from the imaginary light emitting point Pe displaced from the laser beam L optical axis by a predetermined amount in the sub scanning direction so as to be guided to the collimator lens 32.

As a result, the normal ray and the abnormal ray are respectively collected at a position on the recording film F displaced by the predetermined amount in the sub scanning direction via the collimator lens 32 and the light collecting lens 38, so as to obtain the beam spots S1' to S7' shown in FIG. 9D. Thereby, an image of the R (dpi) resolution can be formed.

In contrast, in the case of forming an image of the 2·R (dpi) resolution, the beam spots S1 to S7 shown in FIG. 9A can be obtained by moving the polarization-separating element 36 off the optical path of the laser beam L.

As heretofore explained in detail, according to the polarization-direction-controlling element 34 of the above-mentioned embodiments, since the polarization-direction-controlling element provided on the upstream side along the optical axis direction of the laser beam L from the polarization-separating element 36 for separating the laser beam L into two laser beams having polarization directions orthogonal to each other is provided on the upstream side along the optical axis direction from the polarization-separating element 36 for transmitting a part of the laser beam L and the ½ wavelength plate 34A is disposed with the crystal optical axis tilted by substantial 45 degrees with respect to the light polarization direction of the light separated by the polarization-separating element 36, the laser beam L can be separated by the equal light amount by the polarization-separating element 36 in the case of using in a combination with the polarization-separating element 36 so that the image quality of the recorded image can be improved in the laser recording device using the polarization-separating element 36.

Moreover, according to the polarization-direction-controlling element 34 of the above-mentioned embodiments, since the ratio of the area of the ½ wavelength plate 34A with the laser beam L incident thereon and the area of the laser beam L not incident on the ½ wavelength plate 34A, that is, the area of the glass plate 34B with the laser beam L directly incident thereon can be substantially 1:1, the intensity distribution of the separated laser beam can be evened.

Furthermore, according to the polarization-direction-controlling element 34 of the above-mentioned embodiments, since a plurality of the ½ wavelength plates 34A are provided on the entire laser beam L incident area at predetermined intervals, it can be produced easily.

Moreover, according to the laser recording devices 10A, 10B of the above-mentioned embodiments, since the polarization-direction-controlling element 34 as mentioned above is disposed with the crystal optical axis of the ½ wavelength plate 34A tilted by substantially 45 degrees with respect to the polarization direction of the laser beam L separated by the polarization-separating element 36 between the semiconductor laser LD and the polarization-separating element 36, the laser beam L can be separated by the equal light amount by the polarization-separating element 36 so that the image quality of the image at the time of recording an image on the recording film F by the separated laser beam L can be improved.

Moreover, according to the laser recording devices 10A, 10B of the above-mentioned embodiments, since the element moving motor 40 for moving the polarization-separating element 36 for inserting and removing the polarization-separating element 36 on the optical axis of the laser beam L or removing therefrom is provided, the resolution at the time of recording an image on the recording film can easily be changed by inserting and removing the polarization-separating element 36 on the optical axis or removing therefrom by the element moving motor 40.

Figure 12A:
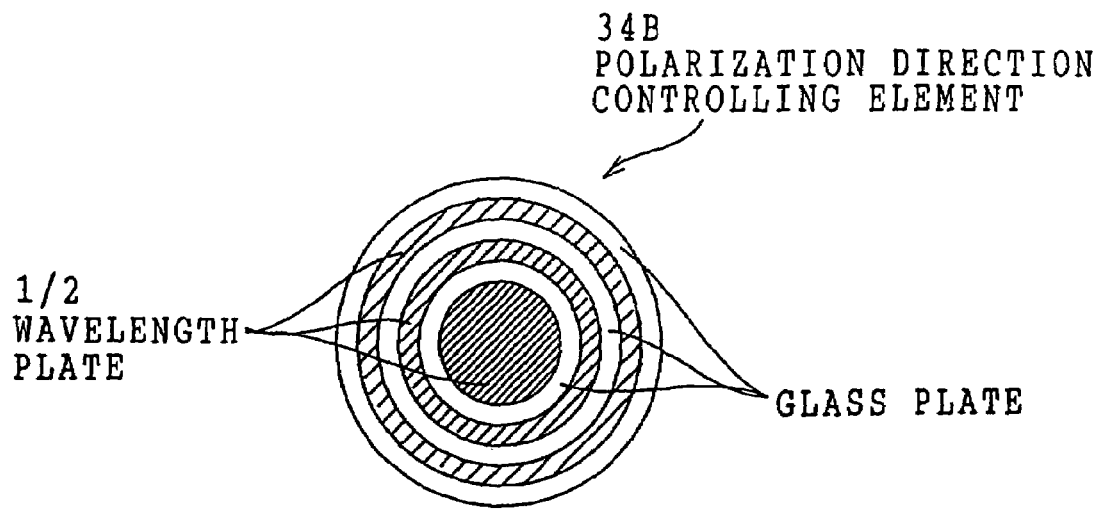
FIG. 12A is a schematic configuration diagram (front view) showing another configuration example of a polarization-direction-controlling element of the invention.

Although the case of using the polarization-direction-controlling element 34 (see FIG. 4A) provided by attaching a plurality of flat plate-like ½ wavelength plates 34A on a glass plate 34B by a predetermined interval as the polarization-direction-controlling element of the invention has been explained in the above-mentioned embodiments, the invention is not limited thereto, and for example, as shown in FIG. 12A, an embodiment provided by attaching a plurality of cylindrical ½ wavelength plates with the crystal optical axis tilted by substantially 45 degrees with respect to the polarization direction of the light separated by the polarization-separating element with respect to a columnar glass plate, having different sizes onto the concentric circles of the above-mentioned glass plate can be adopted as well. Also in this case, the same effect as in the above-mentioned embodiments can be achieved.

Figure 12B:
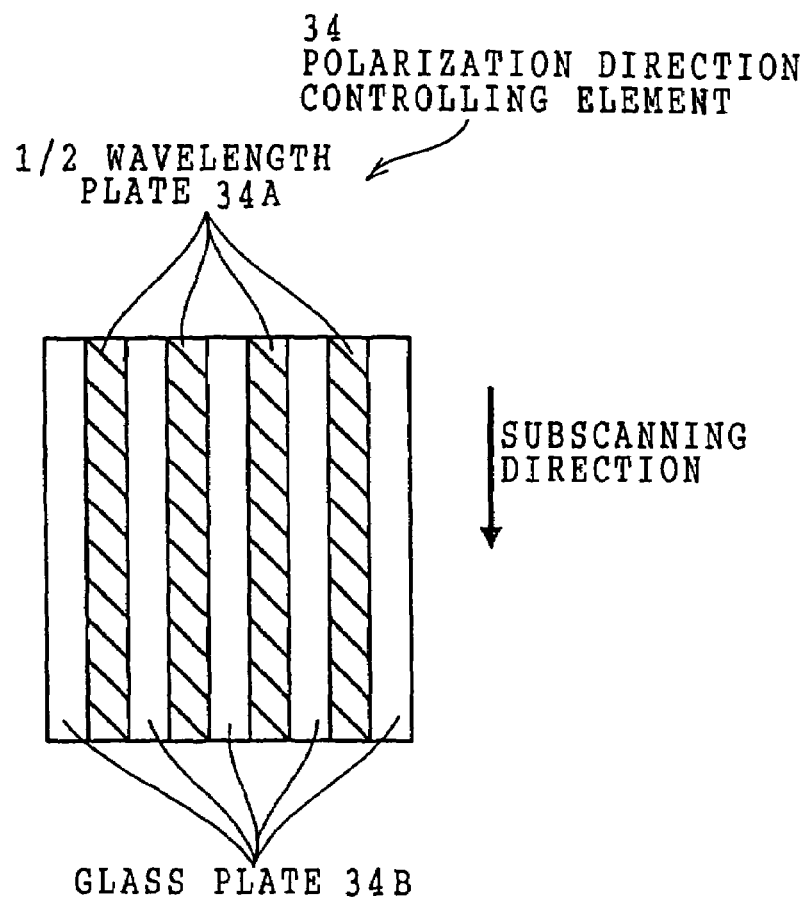
FIG. 12B is a schematic diagram showing another arrangement state of a polarization-direction-controlling element according to the invention.
Figure 13:
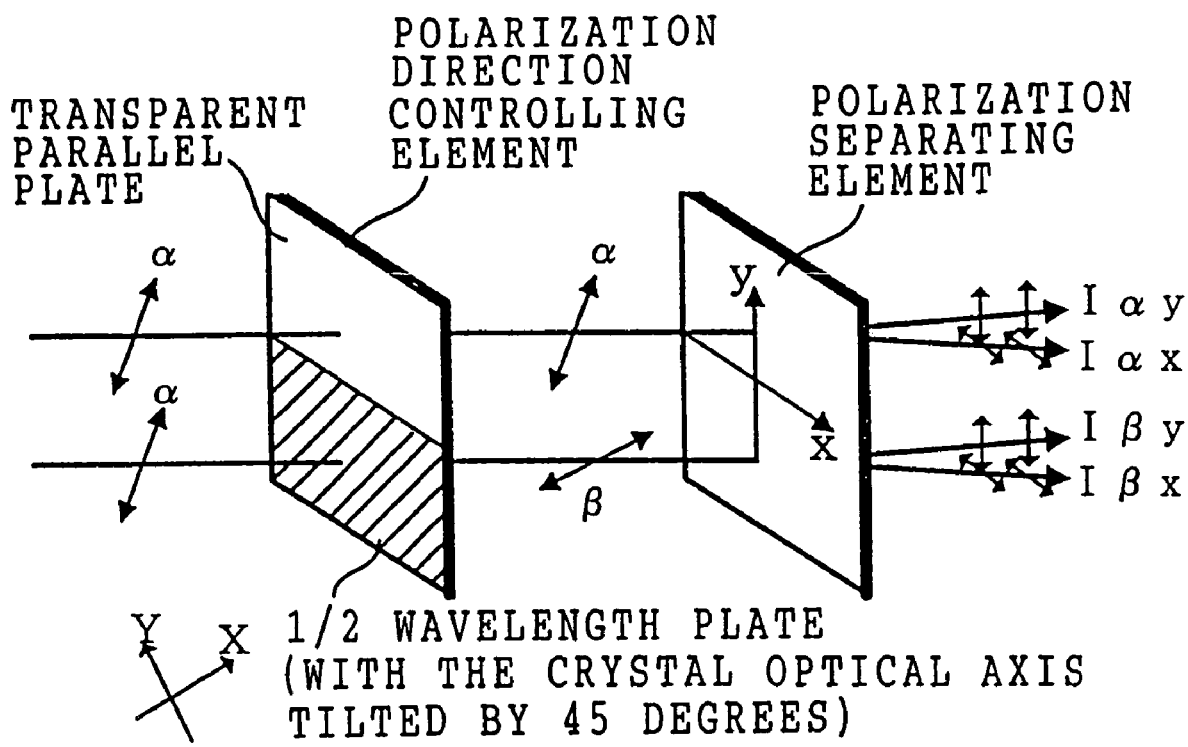
FIG. 13 is a schematic diagram for explaining the principal of the invention.
Figure 14:
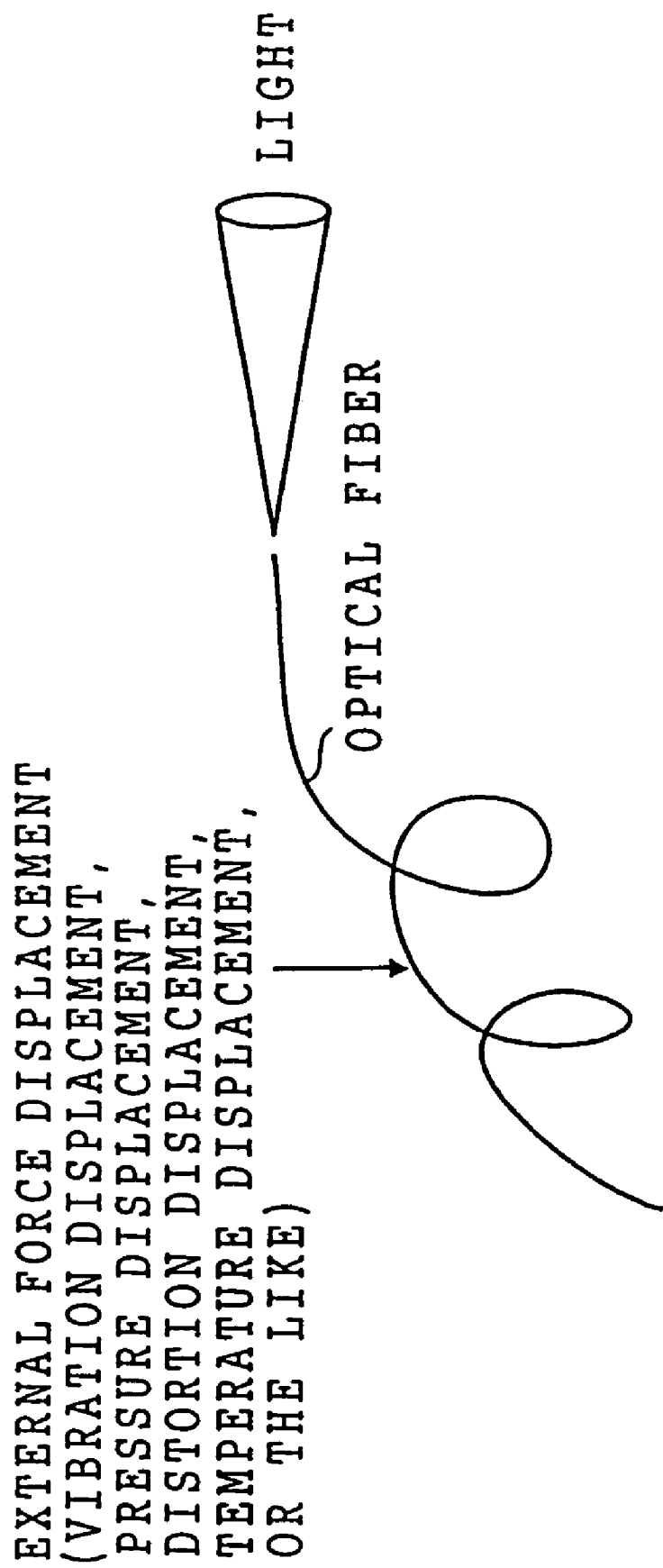
FIG. 14 is a schematic diagram for explaining the problems in the conventional technique.

Moreover, although the case of the polarization-direction-controlling element 34 with a plurality of ½ wavelength plates 34A arranged in the sub scanning direction has been explained in the above-mentioned embodiments, the invention is not limited thereto, and for example, as shown in FIG. 12B, an embodiment with the arrangement direction which is orthogonal to the sub scanning direction can be adopted as well. Also in this case, the same effect as in the above-mentioned embodiments can be achieved.

Furthermore, although the case of adopting the invention in the laser recording devices 10A, 10B for executing the multiple beam scanning has been explained in the above-mentioned embodiments, the invention is not limited thereto, and for example, it can be adopted in a laser recording device for executing the single beam scanning, comprising one semiconductor laser as the light source. Also in this case, the same effect as in the above-mentioned embodiments can be achieved.

Moreover, although the case of providing the element moving motor 40 for only inserting the polarization-separating element 36 on the optical path of the laser beam L or removing therefrom has been explained in the above-mentioned embodiments, the invention is not limited thereto, and the element moving motor 40 can be provided for simultaneously inserting the polarization-direction-controlling element 34 and the polarization-separating element 36 on the optical path of the laser beam or removing therefrom. Also in this case, the same effect as in the above-mentioned embodiments can be achieved.

Furthermore, although the case of disposing the polarization-separating element 36' at a position for dispersing the laser beam has been explained in the above-mentioned second embodiment, the invention is not limited thereto, and for example, it can be disposed at a position where the laser beam is condensed, that is, between the light collecting lens 38 and the recording film F. Also in this case, the same effect as in the above-mentioned second embodiment can be achieved.

What is claimed is:

1. A polarization-direction-controlling element, comprising:
   a ½ wavelength plate; and
   a transparent parallel plate,
   wherein the ½ wavelength plate is attached to the transparent parallel plate,
   wherein the polarization-direction-controlling element is configured such that an amount of incident light on the polarization-direction-controlling element that is transmitted by the ½ wavelength plate and an amount of the incident light transmitted by the transparent plate on a portion other than the ½ wavelength plate are substantially the same, and
   wherein the polarization-direction-controlling element is configured such that light incident on the ½ wavelength plate has the same polarization as the incident light.

2. The polarization-direction-controlling element of claim 1, wherein the ½ wavelength plate forms substantially a circular pattern on the transparent parallel plate.

3. The polarization-direction-controlling element of claim 1, wherein the ½ wavelength plate comprises a plurality of ½ wavelength plate portions disposed on the transparent parallel plate at predetermined intervals.

* * * * *